Apr. 24, 1923.

F. PAEDERSEN 1,452,754

SLIDING GEAR TRANSMISSION FOR FORD AUTOMOBILES

Filed Feb. 4, 1920

Fig. 1.

Fig. 2.

WITNESSES

INVENTOR
F. Paedersen
BY
ATTORNEYS

Patented Apr. 24, 1923.

1,452,754

UNITED STATES PATENT OFFICE.

FRED PAEDERSEN, OF OAKLAND, MINNESOTA.

SLIDING-GEAR TRANSMISSION FOR FORD AUTOMOBILES.

Application filed February 4, 1920. Serial No. 356,187.

*To all whom it may concern:*

Be it known that I, FRED PAEDERSEN, a citizen of the United States, and a resident of Oakland, in the county of Freeborn and State of Minnesota, have invented certain new and useful Improvements in Sliding-Gear Transmissions for Ford Automobiles, of which the following is a specification.

My present invention relates generally to transmission devices for Ford automobiles, and more particularly to a sliding gear transmission designed for Ford automobiles, my object being the provision of a device which will relieve a long felt want in muddy, sandy and hilly countries and will be highly practical for tourists especially with trailers, light delivery trucks and cars.

In the accompanying drawing which illustrates my present invention and forms a part of this specification, Figure 1 is a vertical sectional view through my improvements, and Figure 2 is a top plan view illustrating the preferred relation of parts including my improvements, in connection with a Ford automobile.

Referring now to these figures, my invention proposes a sliding gear transmission including a transmission case 10, to the front 11 of which around its central bearing 12 the front ball cap 13 of a Ford universal joint may be connected, the application of my improvements in a Ford involving the removal of a section of the usual Ford drive shaft and drive shaft tube at their front ends.

Through the front bearing 12 of the transmission case 10 a transmission pinion shaft 14 is extended as seen in Figure 1, provided with a squared forward end 15 to form a male knuckle for co-operation with the usual socket or female knuckle in the ordinary Ford transmission housing indicated generally at 16 in Figure 2.

The rear end of the transmission pinion shaft 14 has a transmission driving pinion 17 within the transmission case 10 proposed by my invention, in constant mesh with the larger of two counter shaft gears 18 and 19 which are integral with one another and rotate upon a counter shaft 20, the inner rear end of shaft 14 having an axial bore which receives the reduced forward end 21 of a sliding gear shaft 22 between which and the adjacent surface of the driving pinion 17 is a thrust bearing member 23.

Within the rear side 24 of the transmission case 10 is secured the front half 25 of the cap of a universal joint 26, whose male knuckle 27 interfits the socket or female knuckle 28 of the rear end of the sliding gear shaft 22, so as to thus properly connect with the shortened drive shaft and drive shaft tube generally indicated at 29 in Figure 2.

Splined on the sliding gear shaft 22 is a sliding gear 30 having a rear annularly grooved extension 31 and peripheral teeth 32, the latter of which are movable into and out of engagement with the smaller gear 19 of the two counter shaft gears. The front face of the sliding gear 30 is moreover cut away and provided with an annular internally geared surface 33 engageable with the teeth of the driving pinion 17 which for this purpose is made of considerably greater width than the larger gear 18 of the countershaft gears in constant mesh therewith as before described.

The annularly grooved rear extension 31 of the sliding gear is engaged by the depending fork of a yoke 34 shiftable with a horizontally movable locking bar 35, the latter moving in bearings 36 carried by the cap 37 of the gear case. This locking bar has notches 38, 39 and 40 corresponding with its low neutral and high gear positions, and one of the bearings 36 has a spring controlled locking pin 41, the tension of which is controlled by an exteriorly projecting screw 42, and the inner headed end of which co-operates with the notched locking bar 35 to latch the same in each of its mentioned positions.

The upper portion of the shifting yoke 34 has a concave recess 43 which receives the lower ball shaped end 44 of an upstanding shifting lever 45 whose fulcrum 46 is carried by the cap 37 of the gear case.

In this way it is obvious that the device may be readily installed in connection with a Ford automobile of usual construction, for the purposes and to the obvious advantages first above mentioned, and that if desired the gear case may be formed integral with and as a part of the drive shaft tube and located at various points in the length of the drive shaft and its tube in its practical adaptation.

It is also obvious that by shifting the upper portion of the gear shifting lever 45 in a forward direction or in the direction of the arrow of Figure 1, the sliding gear 30 will be shifted rearwardly and engaged with the smaller gear 19 of the counter shaft gears, thus completing low speed transmission through gears 17, 18, 19 and 30. When the parts are in the described position the locking pin 41 will be engaged with the notch 38 of the locking bar 35 so as to avoid danger of accidental displacement. Figure 1 shows the position of the parts in neutral, with the sliding gear 30 positioned between and out of contact with the counter shaft gear 19 and the driving pinion 17, and with the locking pin 41 engaged in the notch 39 of the locking bar. It is obvious from this description that if the upper portion of lever 45 is shifted rearwardly from the position of Figure 1, the sliding gear 30 will be thrust forwardly so as to engage its internally geared side portion with the driving pinion 17 and thus form a direct connection between the transmission pinion shaft 14 and the sliding gear shaft 22.

In the installation of the sliding gear transmission as proposed by my invention, its case may be supported in any suitable manner as by means of upstanding supporting arms connected to the side portions 47 of the frame as seen in Figure 2, or by means of a channel beam 48 whose ends are connected to the frame portion 47 and whose intermediate portion passes beneath the case 10 as seen in Figure 1.

I claim:

A sliding gear transmission for Ford automobiles, which consists of a gear case, a transmission pinion shaft journaled therein, having a transmission drive pinion at its inner rear end and also having an axial bore and a counter bore, a sliding gear shaft also journaled in the gear case, axially alined with said transmission pinion shaft and having a reduced end within the said bore and a thrust ring within the said counter bore, said shafts having respectively male and female knuckle members at their outer ends, a sliding gear on the last mentioned shaft having an internally geared portion on one side to engage the transmission pinion, a counter shaft, and connected gears on the counter shaft, one of which is permanently in mesh with the transmission pinion, and with the other of which said sliding gear is detachably engageable, means for shifting the sliding gear between the transmission pinion and the last mentioned counter shaft gear, and into and out of engagement therewith, and means for holding the sliding gear in shifted position, said transmission pinion being of sufficiently greater thickness than its respective counter shaft gear to receive the internally geared portion of the sliding gear in operative engagement therewith at one side of its said counter shaft gear.

FRED PAEDERSEN.